United States Patent
Xiong et al.

(10) Patent No.: US 11,741,671 B2
(45) Date of Patent: Aug. 29, 2023

(54) THREE-DIMENSIONAL SCENE RECREATION USING DEPTH FUSION

(71) Applicant: SAMSUNG ELECTRONICS CO., LTD., Gyeonggi-Do (KR)

(72) Inventors: Yingen Xiong, Mountain View, CA (US); Christopher A. Peri, Mountain View, CA (US)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 17/500,817

(22) Filed: Oct. 13, 2021

(65) Prior Publication Data

US 2022/0406013 A1    Dec. 22, 2022

Related U.S. Application Data

(60) Provisional application No. 63/211,227, filed on Jun. 16, 2021.

(51) Int. Cl.
*G06T 17/20* (2006.01)
*G06N 20/00* (2019.01)
(Continued)

(52) U.S. Cl.
CPC ............. *G06T 17/20* (2013.01); *G06N 20/00* (2019.01); *G06T 3/4053* (2013.01); *G06T 7/55* (2017.01);
(Continued)

(58) Field of Classification Search
None
See application file for complete search history.

(56) References Cited

U.S. PATENT DOCUMENTS 10,003,783 B2  6/2018  Plank et al.
10,699,432 B2  6/2020  Lee
(Continued)

FOREIGN PATENT DOCUMENTS

CN   110992271 A   4/2020
KR   101378190 B1  3/2014
(Continued)

OTHER PUBLICATIONS

Li, B. et al., "Depth image super-resolution based on joint sparse coding," Pattern Recognition Letters, vol. 130, pp. 21-29, Feb. 2020, 23 pg.

(Continued)

*Primary Examiner* — Michael J Cobb
(74) *Attorney, Agent, or Firm* — CUENOT, FORSYTHE & KIM, LLC

(57) ABSTRACT

Generating a 3D scene reconstruction using depth fusion can include creating a high-resolution sparse depth map by mapping sensor depths from a low-resolution depth map to points corresponding to pixels of a high-resolution color image of a scene. The high-resolution sparse depth map can have the same resolution as the high-resolution color image. A fused sparse depth map can be produced by combining the high-resolution sparse depth map with sparse depths reconstructed from the high-resolution color image. The high-resolution dense depth map can be generated based on fused sparse depths of the fused sparse depth map.

20 Claims, 6 Drawing Sheets

(51) Int. Cl.
 *G06T 3/40* (2006.01)
 *G06T 7/55* (2017.01)
 *G06T 19/00* (2011.01)
 *G06T 19/20* (2011.01)

(52) U.S. Cl.
 CPC ............ *G06T 19/006* (2013.01); *G06T 19/20* (2013.01); *G06T 2207/10024* (2013.01)

(56) References Cited

U.S. PATENT DOCUMENTS

| | | | |
|---|---|---|---|
| 10,748,247 | B2 | 8/2020 | Paluri |
| 2014/0146139 | A1* | 5/2014 | Schwartz ............. H04N 13/128 348/43 |
| 2015/0310620 | A1* | 10/2015 | Aviv ....................... G06T 7/593 382/154 |
| 2017/0372510 | A1 | 12/2017 | Ye et al. |
| 2018/0165796 | A1 | 6/2018 | Lai et al. |
| 2018/0218485 | A1 | 8/2018 | Xi et al. |
| 2018/0302612 | A1 | 10/2018 | Kopf et al. |
| 2018/0374227 | A1 | 12/2018 | Varekamp et al. |
| 2020/0265597 | A1 | 8/2020 | Ye et al. |
| 2020/0273190 | A1 | 8/2020 | Ye et al. |
| 2020/0273192 | A1* | 8/2020 | Cheng .................... G06T 7/593 |
| 2021/0034221 | A1 | 2/2021 | Phaisanwiphatpong et al. |
| 2021/0103763 | A1* | 4/2021 | Fan ......................... G01S 17/89 |
| 2021/0142497 | A1* | 5/2021 | Pugh ........................ G06T 7/55 |
| 2021/0174524 | A1* | 6/2021 | Wang ................... G06N 3/0454 |
| 2022/0148203 | A1* | 5/2022 | Guizilini ............ G01C 21/3811 |
| 2022/0180543 | A1* | 6/2022 | Ling ........................ G06T 3/40 |
| 2022/0262023 | A1* | 8/2022 | Vignard ................ G06V 10/82 |

FOREIGN PATENT DOCUMENTS

| | | |
|---|---|---|
| KR | 101619327 B1 | 5/2016 |
| KR | 20170025214 A | 3/2017 |
| KR | 101745493 B1 | 6/2017 |
| KR | 102229861 B1 | 3/2021 |

OTHER PUBLICATIONS

Luo, Y. et al., "Full resolution Dense Depth Recovery by Fusing RGB Images and Sparse Depth," 2019 Proc. of IEEE Int'l. Conf. on Robotics and Biomimetics (ROBIO), pp. 1659-1663, Dec. 2019.
WIPO Appln. PCT/KR2022/008390, International Search Report and Written Opinion, dated Sep. 19, 2022, 8 pg.

* cited by examiner

300

```
Create a high-resolution sparse depth map by mapping sensor depths from a low-resolution
depth map to points corresponding to pixels of a high-resolution color image of a scene,
wherein the high-resolution sparse depth map has a same resolution as the high-resolution
color image
302
```

```
Produce a fused sparse depth map by combining the high-resolution sparse depth map with
sparse depths reconstructed from the high-resolution color image
304
```

```
Generate a high-resolution dense depth map based on fused sparse depths of the fused sparse
depth map
306
```

```
┌─────────────────────────────────────────────────────────────────────────────┐
│ Apply a sensor depth at each pixel of a fused sparse depth map for which a  │
│                     corresponding sensor depth is available                 │
│                                     402                                     │
└─────────────────────────────────────────────────────────────────────────────┘
                                       ↓
┌─────────────────────────────────────────────────────────────────────────────┐
│ Apply a reconstructed sparse depth at each pixel of the fused sparse depth  │
│ map for which a corresponding sensor depth is unavailable and a             │
│ corresponding sparse depth is available                                     │
│                                     404                                     │
└─────────────────────────────────────────────────────────────────────────────┘
                                       ↓
┌─────────────────────────────────────────────────────────────────────────────┐
│ Apply a sensor depth at each pixel of the fused sparse depth map for which  │
│ both a corresponding reconstructed depth and corresponding sensor depth are │
│ available and the sensor depth has a confidence equal to or greater than a  │
│ predetermined threshold                                                     │
│                                     406                                     │
└─────────────────────────────────────────────────────────────────────────────┘
                                       ↓
┌─────────────────────────────────────────────────────────────────────────────┐
│ Apply a depth determined by weighting a sensor depth and a reconstructed    │
│ depth at each pixel of the fused sparse depth map for which both a          │
│ corresponding sensor depth and reconstructed depth are available and the    │
│ sensor depth has a confidence less than the predetermined threshold         │
│                                     408                                     │
└─────────────────────────────────────────────────────────────────────────────┘
```

FIG. 4

THREE-DIMENSIONAL SCENE RECREATION USING DEPTH FUSION

CROSS-REFERENCE TO RELATED APPLICATIONS

This application claims the benefit of U.S. Provisional Patent Application No. 63/211,227 filed on Jun. 16, 2021, which is incorporated herein by reference in its entirety.

TECHNICAL FIELD

This disclosure relates to image processing, and more particularly, to recreating camera-captured scenes in three dimensions.

BACKGROUND

Scene reconstruction in three dimensions has many applications. Applications include medical imaging, artistic works, product design, gaming, and generating XR environments. Three-dimensional (3D) scene reconstruction, for example, can be used by an XR system to create an augmented reality (AR) environment by generating virtual objects and placing the virtual objects in a 3D reconstruction of a real-world scene captured by a camera. A 3D rendering of a scene can be generated from imaging data captured by camera sensors, such as an RGB-D camera or similar device comprising a color sensor and a depth sensor. A color sensor can be configured to capture two-dimensional color information corresponding to the scene. A depth sensor can be configured to capture depth information corresponding to the scene.

SUMMARY

In an example implementation, a method can include creating a high-resolution sparse depth map. The high-resolution sparse depth map can be created by mapping sensor depths from a low-resolution depth map to points corresponding to pixels of a high-resolution color image of a scene. The high-resolution sparse depth map can have a same resolution as the high-resolution color image. The method can include producing a fused sparse depth map by combining the high-resolution sparse depth map with sparse depths reconstructed from the high-resolution color image. The method can include generating a high-resolution dense depth map based on fused sparse depths of the fused sparse depth map.

In another example implementation, a system includes a processor configured to initiate operations. The operations can include creating a high-resolution sparse depth map. The high-resolution sparse depth map can be created by mapping sensor depths from a low-resolution depth map to points corresponding to pixels of a high-resolution color image of a scene. The high-resolution sparse depth map can have a same resolution as the high-resolution color image. The operations can include producing a fused sparse depth map by combining the high-resolution sparse depth map with sparse depths reconstructed from the high-resolution color image. The operations can include generating a high-resolution dense depth map based on fused sparse depths of the fused sparse depth map.

In another example implementation, a computer program product includes one or more computer readable storage media, and program instructions collectively stored on the one or more computer readable storage media. The program instructions are executable by computer hardware to initiate operations. The operations can include creating a high-resolution sparse depth map. The high-resolution sparse depth map can be created by mapping sensor depths from a low-resolution depth map to points corresponding to pixels of a high-resolution color image of a scene. The high-resolution sparse depth map can have a same resolution as the high-resolution color image. The operations can include producing a fused sparse depth map by combining the high-resolution sparse depth map with sparse depths reconstructed from the high-resolution color image. The operations can include generating a high-resolution dense depth map based on fused sparse depths of the fused sparse depth map.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example method for generating a high-resolution dense depth map.

FIG. 4 illustrates an example method for generating a fused sparse depth map.

DETAILED DESCRIPTION

Figure 1:
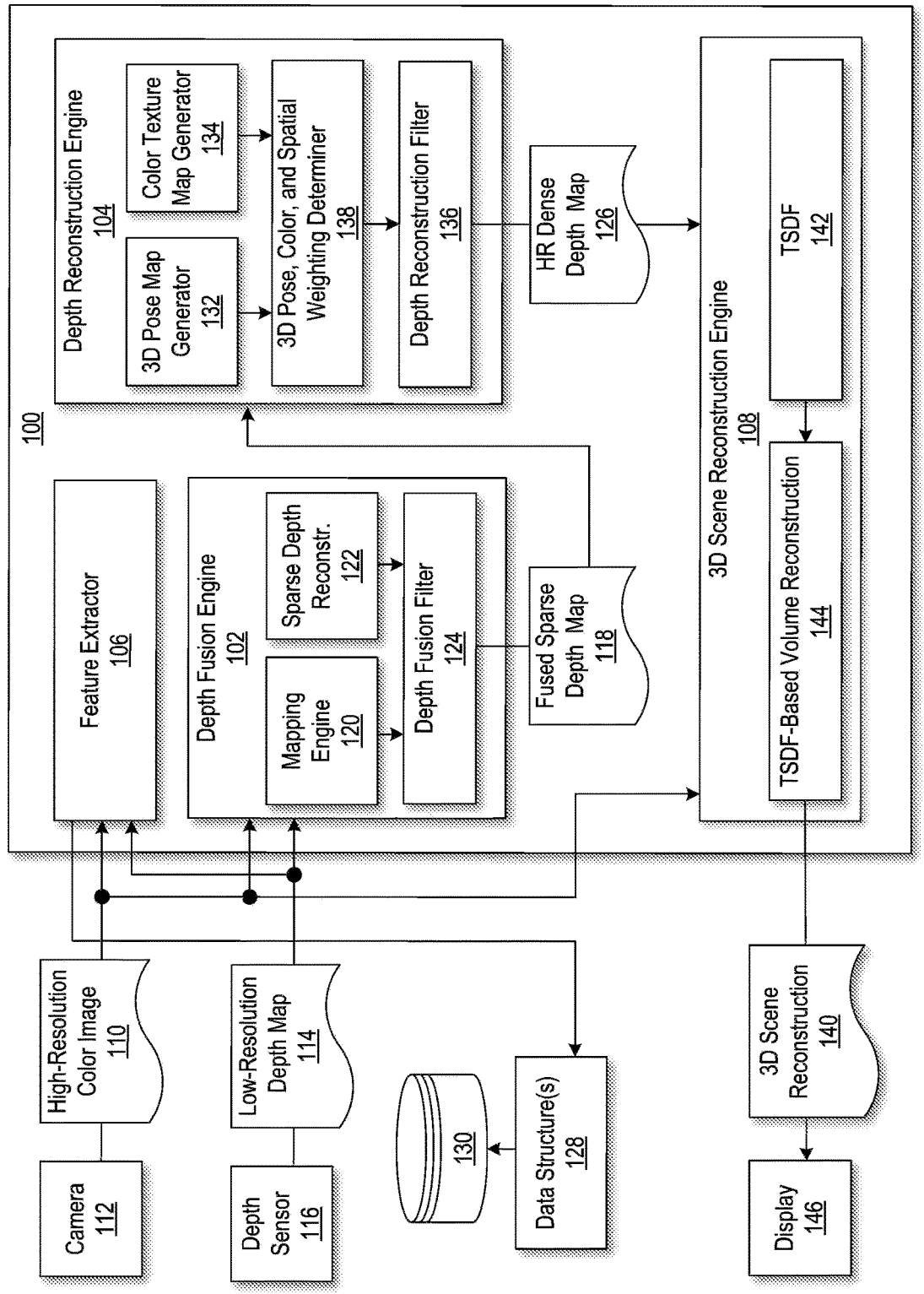
FIG. 1 illustrates an example system for generating a 3D scene reconstruction.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image processing, and more particularly, to recreating camera-captured scenes in three dimensions. Generating a high-quality 3D scene reconstruction requires a dense depth map. A variety of different depth sensor technologies are capable of providing dense depth maps. These technologies suffer from various deficiencies. For example, 3D laser scanning, or light detection and ranging (LiDAR), devices can provide dense depth maps, but are too slow for real-time use and, for many applications too expensive. Structure-light-based sensors are sensitive to sunlight and limited to short-range distance (e.g., suitable only for indoor scenes), while stereo camera techniques often require a large baseline and have a complexity requiring careful calibration but provide poor performance with respect to featureless regions. Depth sensors, such as time-of-flight (ToF) and infrared, single-based devices, can provide fast depths—as compared with other techniques for generating a depth map—but the depth map is a low-resolution, sparse depth map. Noise due to sensor error and limitations of the depth sensors in detecting properties of object surfaces often occur as result of the sparseness of a sparse depth map. As used herein, "sparse depth map" means a map comprising points or image pixels that lack depth information, or simply "depths." Relatedly, "sparse depths" mean depths at certain points or can cause the image pixels of a sparse depth map. Depths also can be reconstructed from color images using, for example, a technique such as structure from motion, but these reconstructed depths, too, are only sparse depths.

In accordance with the inventive arrangements disclosed herein, example methods, systems, and computer program products are provided that are capable of mapping low-resolution sparse depths to a high-resolution depth map by fusing sparse depths from depth sensors and color images to create a high-resolution dense depth map. An aspect of the inventive arrangements described within this disclosure is a volume-based 3D scene reconstruction using a dense depth map created from depth sensors and color images. The 3D scene reconstruction is based on the dense depth map created by fusing depth sensor-generated sensor depths with sparse depths reconstructed from a color image of the scene. As used herein, "fusion" and "fusing" mean the process of aggregating, combining, and/or integrating information from multiple sources. Relatedly, "fused" points or image pixels are ones that aggregate, combine, and/or integrate information from different sources.

The inventive arrangements incorporate depth sensors that though capable of providing fast depths, provide only sparse depth maps as compared with ones provided by more complex depth sensors. By using such depth sensors with the depth fusion techniques described herein, robust and accurate high-resolution, dense depth maps may be generated using less complex and less costly depth sensors. Moreover, as depth sensors generating sparse depth maps operate faster than depth sensors generating dense depth maps, the inventive arrangements described herein are also suited for real-time operation and/or applications.

Another aspect is a depth fusion filter capable of using depth priority and confidence to generate a fused sparse depth map whose points (or pixels) correspond to pixels of a color image, the fused sparse depth map having the same resolution as the color image. The depth fusion filter can generate the fused sparse depth map by computing depths at points of the map based on combinations of depth information extracted from different sources. The depth fusion filter implements a fusion policy whereby sensor depths receive higher priority than sparse depths that are reconstructed from a color image using, for example, structure from motion. The fusion policy implemented by the depth fusion filter uses a weighted averaging of a sensor depth and a reconstructed depth if the confidence for the sensor depth is less than a minimum threshold.

Still another aspect is a depth reconstruction filter capable of generating a high-resolution dense depth map. The depth reconstruction filter can generate the high-resolution dense depth map, in part, from the fused sparse depth map. For depth-empty points (or pixels) of the high-resolution dense depth map, the depth reconstruction filter determines depths based on depths (from the fused sparse depth map) within a predetermined neighborhood of the depth-empty point. In certain arrangements, data structures are created to store the sparse sensor depths and reconstructed depths along with corresponding properties of features extracted from the color image and sensor depth map. The features (or image features) can include specific structures of the image such as edges, objects, object contours, feature (or key) points, or other image information. Properties of a feature can include orientation, position, an indication of whether the feature is a color image feature or depth map feature, the type or category of the feature, an indication of whether the feature is a key feature, a feature confidence, and the like. The features can be used by the depth reconstruction filter to implement a color image-guided process for generating the high-resolution dense depth map, as described below. Features and corresponding properties, as also described below, can be electronically stored as data structures for use in a 3D scene reconstruction process (e.g., object contour points can be used to generate masks used in 3D scene reconstruction).

In certain arrangements, the depth reconstruction filter creates the depths for depth-empty pixels by using 3D pose information from existing depth points, spatial information from the predetermined neighborhood of the depth-empty pixel, and feature information extracted from the sensor depth map and color image. The reconstructed depth map retains object shapes well and provides clear delineation of edges and contours. The depth reconstruction filter's use of the 3D pose, spatial, and feature information during depth reconstruction also reduces artifacts, noise, and false depths by re-computing depths for which there is less than a threshold confidence. The depth reconstruction filter thus is capable of creating a high-quality, high-resolution dense depth map.

The high-resolution dense depth map can be used for generating a 3D scene reconstruction. In certain arrangements, the depth fusion filter and the depth reconstruction filter are integrated into a pipeline for performing depth fusions capable of generating high-resolution dense depth maps used to create 3D scene reconstructions in an XR application.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 6:
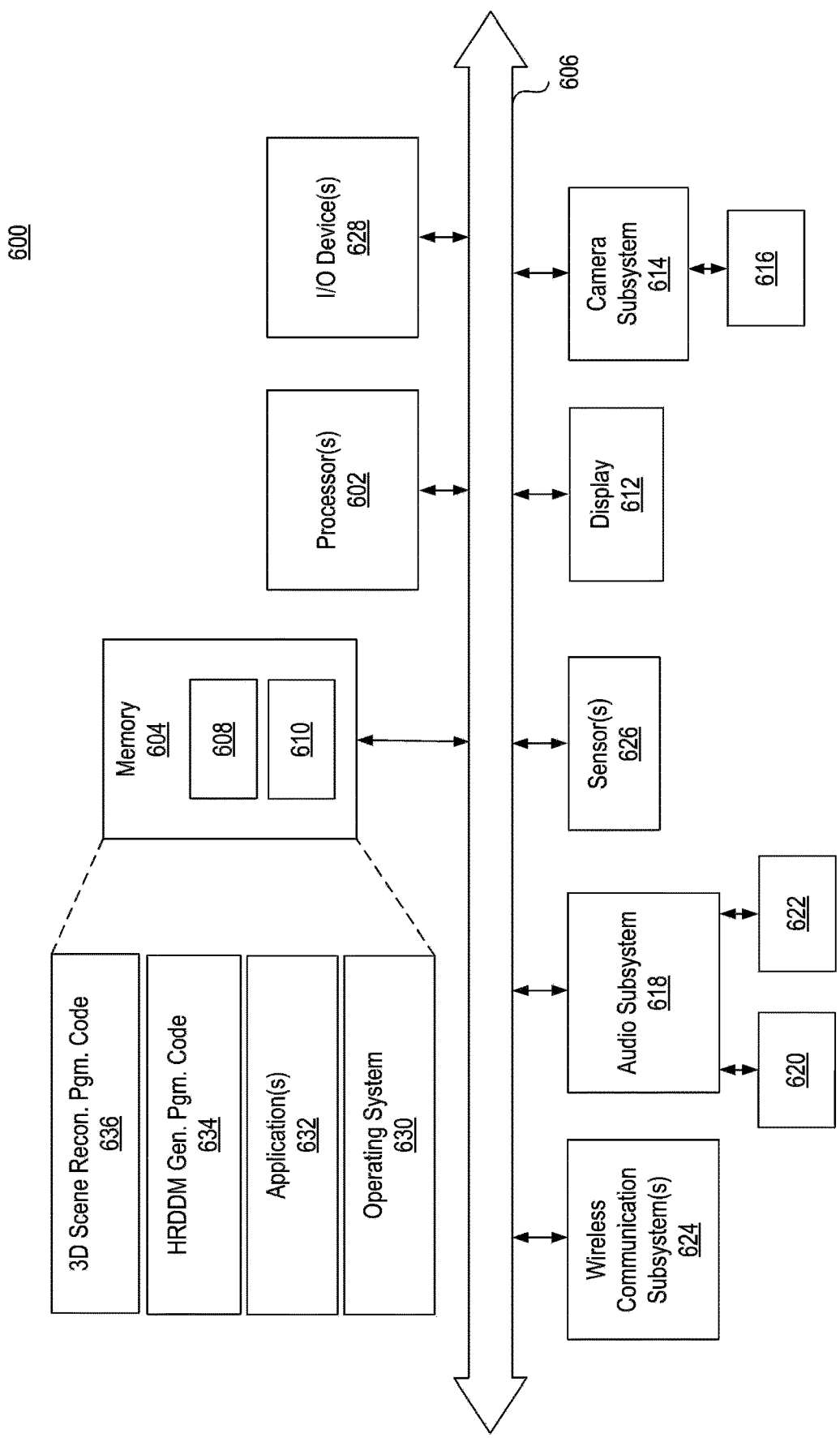
FIG. 6 illustrates an example device for implementing the system of FIG. 1.

FIG. 1 illustrates example system 100 for generating a 3D scene reconstruction. System 100 illustratively includes depth fusion engine 102, depth reconstruction engine 104, feature extractor 106, and 3D scene reconstruction engine 108. In various embodiments, depth fusion engine 102, depth reconstruction engine 104, feature extractor 106, and 3D scene reconstruction engine 108 of system 100 can each be implemented in hardware (e.g., dedicated hardwired circuitry), software (e.g., program code executed by one or more processors), or a combination thereof. For example, system 100 in certain embodiments is implemented in a device, such as device 600, in which system 100 comprises program code that is electronically stored in a memory, such as memory 604, and executes on one or more processors, such as processor(s) 602 (FIG. 6).

In some arrangements, system 100 receives high-resolution color image 110 of a scene from camera 112 via a wired or wireless connection between camera 112 and the device in which system 100 is implemented. System 100, in some arrangements, also receives via a wired or wireless connection low-resolution depth map 114 corresponding to the scene, the low-resolution depth map generated by and received from depth sensor 116.

Depth fusion engine 102 is capable of creating fused sparse depth map 118, which fuses sparse depths from separate sources of depth information from images of the scene. One source of depth information is a high-resolution sparse depth map, which is created by mapping engine 120. Mapping engine 120 maps sensor depths of low-resolution depth map 114 to points corresponding to pixels of high-resolution color image 110. In mapping low-resolution depth map 114 to high-resolution color image 110, mapping engine 120 associates the sensor depths of depth points of low-resolution depth map 114 with corresponding pixels of the high-resolution color image 110. The resulting high-resolution depth map is a sparse depth map but of the same resolution as high-resolution color image 110.

The other source of depth information relied on by depth fusion engine 102 to create fused sparse depth map 118 is a set of sparse depths reconstructed from high-resolution color image 110 by sparse depth reconstructor 122. Sparse depth reconstructor 122, in certain embodiments, implements photogrammetric range imaging, such as structure from motion, to reconstruct the sparse depths from high-resolution color image 110. Using structure from motion, sparse depth reconstructor 122 couples 2D color image sequences with motion vectors describing the transformations from one 2D color image to another to thereby reconstruct the sparse depths based on a 3D structure. In other embodiments, sparse depth reconstructor 122 implements a machine learning model (e.g., deep learning neural network) trained to reconstruct sparse depths based on training samples of color images.

Depth fusion filter 124 fuses the two sources of depth information to produce fused sparse depth map 118, a high-resolution depth map, albeit a sparse one, having the same resolution as the high-resolution color image 110. Depth fusion filter 124 produces fused sparse depth map 118 by mapping sensor depths from low-resolution depth map 114 to corresponding pixels of high-resolution color image 110. Depth fusion filter 124 sets a higher priority on sensor depths of low-resolution depth map 114 generated by depth sensor 116 relative to reconstructed sparse depths reconstructed from high-resolution color image 110 by sparse depth reconstructor 122. The higher priority reflects the higher accuracy that sensor depths tend to have relative to the reconstructed sparse depths reconstructed from color image 110. Sensor depths, however, can exhibit artifacts on edges of objects in an image created by depth sensor 116. On some edges, sensor depths are missing entirely. Reconstructed sparse depths reconstructed from color image 110 by sparse depth reconstructor 122, though of lower priority, can compensate by adding to fused sparse depth map 118 depth information not otherwise provided by the sensor depths. For example, sparse depths can be reconstructed by sparse depth reconstructor 122 for image features, including edges and object contours. For each pixel (corresponding to the pixels of color image 110) of fused sparse depth map 118, depth fusion filter 124 implements the following depth fusion rule:

$$D(p) = \begin{cases} d_s(p) & \text{if } d_s(p) > 0, \\ d_r(p) & \text{if } d_s(p) = 0 \text{ and } d_r(p) > 0, \\ d_s(p) & \text{if } d_s(p) > 0 \text{ and } d_r(p) > 0 \text{ and} \\ & C_s \text{ is high,} \\ \lambda_s d_s(p) + \lambda_r d_r(p) & \text{if } d_s(p) > 0 \text{ and} \\ & d_r(p) > 0 \text{ and } C_s \text{ is low,} \\ 0 & \text{others,} \end{cases}$$

where $d_s(p)$ is a sensor depth at a pixel p, $d_r(p)$ is a reconstructed sparse depth at a pixel p, C is a confidence for a sensor depth at a pixel p, and where $\lambda_r$ and $\lambda_s$, respectively, are weights generated for reconstructed sparse depths and sensor depths. The depth fusion rule implements a depth fusion policy in which a sensor depth with confidence, C, equal to or greater than a predetermined threshold is given priority over a sparse depth if both the sensor depth and reconstructed sparse depth are available at a given pixel. Otherwise, if both are available, but the confidence, C, of the sensor depth is less than the predetermined threshold, then the pixel receives a depth that is computed as a weighted average of the sensor depth and reconstructed sparse depth. If no sensor depth is available at a given pixel, but a reconstructed sparse depth is, then the pixel is given the depth of the sparse depth. Any pixel for which no depth is available is an empty-depth pixel.

Implementing the depth fusion rule, depth fusion filter 124 combines the two sources of depth information (sensor depths and reconstructed sparse depths) at each pixel of fused sparse depth map 118 by assigning a corresponding sensor depth if available; by assigning a reconstructed sparse depth if a corresponding reconstructed sparse depth is available and a corresponding sensor depth is not; assigning a corresponding sensor depth if both a sensor depth and reconstructed sparse depth are available, but the confidence afforded the sensor depth is equal to or greater than a predetermined threshold; and assigning a depth determined by weighting a sensor depth and a reconstructed sparse depth if both are available but the confidence afforded the sensor depth is less than the predetermined threshold. Otherwise, if neither a corresponding sensor depth nor reconstructed sparse depth is available, the pixel remains a depth-empty pixel.

Figure 2:
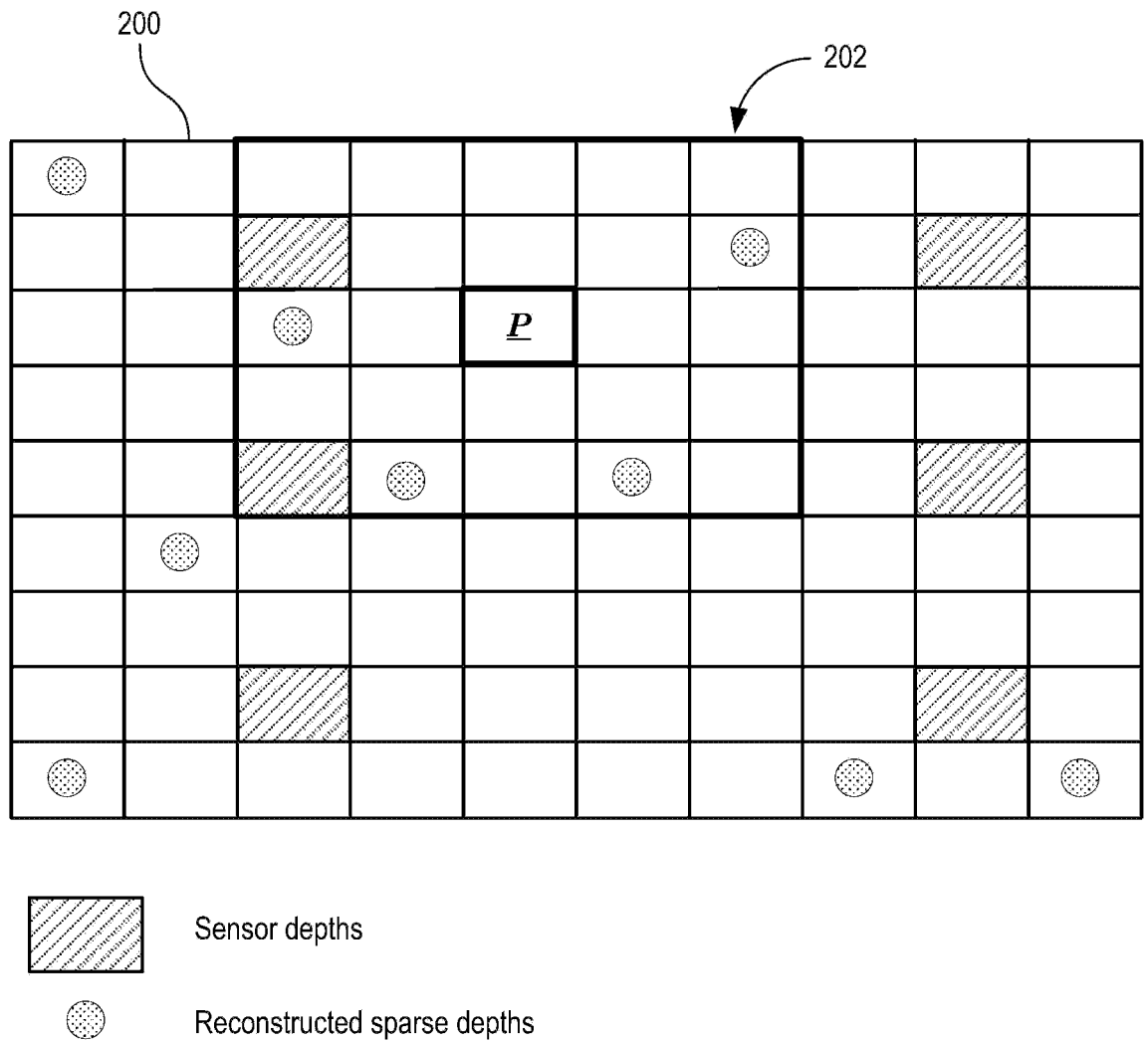
FIG. 2 illustrates an example neighborhood of a high-resolution dense depth map.

Depth reconstruction engine 104 is capable of generating high-resolution dense depth map 126. High-resolution dense depth map 126 has the same resolution as high-resolution color image 110. Depth reconstruction filter 136 provides a fused depth from fused sparse depth map 118 for a corresponding pixel of high-resolution dense depth map 126, but only as available. As described above, fused sparse depth map 118 is a sparse depth map and thus does not provide a depth for every pixel of high-resolution dense depth map 126. Accordingly, depth reconstruction filter 136 provides the computed depths where not otherwise available from fused sparse depth map 118. In certain arrangements, for a given pixel, p, a computed depth d(p) is based on pixels, q∈N, within predetermined neighborhood N of pixel p, for which depths are available. The depths of pixels q∈N are obtained by depth reconstruction filter 136 from fused sparse depth map 118. FIG. 2 schematically illustrates portion 200 of high-resolution dense depth map 126. Depth reconstruction filter 136 computes a depth of pixel p with respect to neighborhood 602, where neighborhood 202 is a 5×5 pixel section that includes sensor depths and reconstructed sparse depths. Although illustratively neighborhood 202 is shown as a 5×5 pixel section, in other arrangements a differently sized neighborhood can be used.

Each depth d(p) is computed based on a weighting of the depths of pixels q∈N obtained by depth reconstruction filter 136 from fused sparse depth map 118. The weights can be determined by depth reconstruction engine 104 based on features extracted by feature extractor 106 from high-resolution color image 110 and from low-resolution depth map 114. The extracted features can include edges, contours, and properties of the features, such as spatial information (e.g., position and orientation) of objects in the image and key points of the image of the scene captured by high-resolution color image 110 and low-resolution depth map 114. Optionally, system 100 creates one or more data structures 128 comprising the various extracted features by feature extractor 106, singly or in combination with fused depths from fused sparse depth map 118. Feature extractor 106 can extract the features upon system 100's receiving high-resolution color image 110 and low-resolution depth map 114, and system 100 can electronically store data structure(s) 128 in electronic store 130 for subsequent processing by depth reconstruction engine 104.

Depth reconstruction engine 104 includes 3D pose map generator 132, which generates a 3D pose map based on extracted pose features. Depth reconstruction engine 104 also includes color texture map generator 134, which generates a color texture map based on extracted color features. High-resolution dense depth map 126 is generated by depth reconstruction filter 136 through color image-guided depth reconstruction implemented by depth reconstruction engine 104 using the 3D pose map and color texture map. The 3D pose map and color texture map provide information for determining the weights that are applied to the depths of pixels q∈N obtained from fused sparse depth map 118 to compute a depth d (p) for each depth-empty pixel. A first weight, a second weight, and a third weight are determined by 3D pose, color, and spatial weighting determiner 138 of depth reconstruction engine 104. The first weight, $w_d$, is determined from the 3D pose map that is generated by 3D pose map generator 132 and from feature information that is extracted by feature extractor 106 from low-resolution depth map 114. The second weight, $w_s$, is determined from spatial information. The third weight, $w_c$, is determined from color and image feature information extracted from the color texture map generated by color texture map generator 134 and from color information extracted from high-resolution color image 110 by feature extractor 106.

The first weight, $w_d$, can be determined by 3D pose, color, and spatial weighting determiner 138 based on a normalized pose difference between pixel p and each pixel $p_n \in N(p)$, within a predetermined neighborhood N of pixel p (FIG. 2):

$$\text{diff}_{pose} = \|P(p) - P(p_n)\|.$$

Based on the pose difference, as normalized, the first weight, $w_d$, in certain arrangements, is determined according to a Gaussian distribution, $W_d(p, p_n) = e^{-(\text{diff}_{pose} - \mu_p)^2 / 2\sigma_p^2}$, where ($\mu_p$, $\sigma$) are the mean and standard deviation Gaussian distribution parameters for the pose weight.

The second weight, $w_s$, can be determined by 3D pose, color, and spatial weighting determiner 138 based on a normalized spatial difference between the considered pixel p and each pixel $p_n \in N(p)$ of neighbor N of pixel p (FIG. 2):

$$\text{diff}_{spatial} = \|p - p_n\|.$$

Based on the pose difference, as normalized, the second weight, $w_s$, in certain arrangements, is also determined according to a Gaussian distribution, $W_s(p, p_n) = e^{-(\text{diff}_{spatial} - \mu_s)^2 / 2\sigma_s^2}$, wherein, ($\mu_s$, $\sigma_s$) are the Gaussian distribution parameters for the spatial weight.

3D pose, color, and spatial weighting determiner 138 determines the third weight, $w_c$, by computing a color (e.g., intensity) difference between the considered pixel p and each pixel $p_n \in N(p)$ in the neighborhood N of pixel p and normalizing the difference:

$$\text{diff}_{color} = \|(I(p) - I(p_n)\|.$$

Based on the normalized difference, the third weight, $w_c$, in certain arrangements is also determined according to a Gaussian distribution, $W_c(p, p_n) = e^{-(\text{diff}_{color} - \mu_c)^2 / 2\sigma_c^2}$, where ($\mu_c$, $\sigma_c$) are the Gaussian distribution parameters for the color weight.

Depth reconstruction filter 136 computes each depth d(p) based on the sensor depths and reconstructed sparse depths, and weights $w_d$, $w_s$, and $w_c$. The computed depth d(p) is $$\frac{\Gamma(w_d, w_s, w_c, d, p)}{W(w_d, w_s, w_c)} = \frac{\sum_{p_n \in N(p)} W_d(p, p_n) W_s(p, p_n) W_c(p, p_n) d(p_n)}{\sum_{p_n \in N(p)} W_d(p, p_n) W_s(p, p_n) W_c(p, p_n)}.$$

Depth reconstruction filter 136 processes each pixel of high-resolution dense depth map 126 providing fused depths from fused sparse depth map 118 as available and otherwise computing for each depth-empty pixel a computed depth based on the weighting of fused depths within each predetermined neighborhood.

High-resolution dense depth map 126 is generated using depths initially generated by or reconstructed from depths generated by sensors that generate fast, sparse depths. For example, such sensors may be camera 112 and depth sensor 116, which is capable of generating fast depths—depths generated more rapidly than ones generated by more complex devices. Depth sensors operate faster than other more complex, albeit slower, devices capable of generating dense depth maps, and thus system 100 enables the use of depth sensors for generating high-resolution dense depth maps for real-time operations and/or applications, including image processing such as 3D scene reconstruction. However, this disclosure contemplates that the methods described herein may improve depths output by complex devices if such devices generate fast, sparse depths.

High-resolution dense depth map 126, for example, can be input to 3D scene reconstruction engine 108, which is capable of generating 3D scene reconstruction 140 based on high-resolution dense depth map 126. 3D scene reconstruction 140 is a 3D rendering of the scene captured by camera 112 and depth sensor 116. 3D scene reconstruction engine 108, based on high-resolution dense depth map 126, creates truncated signed distance function (TSDF) 142, which performs TSDF-based volume reconstruction 144 for rendering 3D scene reconstruction 140 on display 146.

System 100 thus can generate high-resolution dense depth map 126 to reconstruct the 3D scene in the camera view. TSDF 142 is created with high-resolution dense depth map 126 and performs TSDF-based volume reconstruction of the scene and generates 3D scene reconstruction 140. System 100 can integrate the three parts together in a pipeline with the inputs of low-resolution depth map 114 from the depth sensor 116 and high-resolution color image 110 from camera 112 and outputs of 3D scene reconstruction 140, which is usually represented with 3D incremental mesh. In certain embodiments in which system 100 is utilized in an XR application, after generating 3D scene reconstruction 140, system 100 can apply 3D scene reconstruction 140 to the XR application and optionally render one or more virtual objects within the scene such that the virtual objects are able to interact with the natural objects also in the scene. Because, as described above, high-resolution dense depth map 126 can be generated using depths generated by one or more camera and depth sensors (e.g., depth sensor 116) capable of fast generation of depths, system 100 is well-suited for integration in or operatively coupling with an XR device for facilitating the generation of 3D scene reconstructions in real-, or near, real-time.

FIG. 3 illustrates example method 300 of generating a high-resolution dense depth map. Method 300 can be performed by a system the same as or similar to system 100.

At block 302, the system is capable of creating a high-resolution sparse depth map. The system can create the high-resolution sparse depth map by mapping sensor depths from a low-resolution depth map to points corresponding to pixels of a high-resolution color image of a scene. The high-resolution sparse depth map can have a resolution that is the same resolution as the high-resolution color image.

At block 304, the system is capable of producing a fused sparse depth map. The system can produce the sparse depth map by combining the high-resolution sparse depth map with sparse depths, the sparse depths reconstructed from the high-resolution color image. In some arrangements, the sparse depths are reconstructed using motion to structure.

At block 306, the system is capable of generating a high-resolution dense depth map. The high-resolution dense depth map can be generated based on fused sparse depths of the fused sparse depth map. The system can generate the high-resolution dense depth map by computing depths for depth-empty pixels based on one or more fused sparse depths of pixels within predetermined neighborhoods of each of the depth-empty pixels. The system can compute depths for depth-empty pixels based on weighting the fused sparse depths.

The system can determine a weight, in certain arrangements, from a 3D pose map generated from pose information extracted from the low-resolution depth map. In some arrangements, the system can determine a weight from spatial information determined by distances between pixels, such as $(p-p_a)$. The system, in still other arrangements, can determine a weight from color and image feature information extracted from the high-resolution color image.

In certain arrangements, the system receives the system can generate a 3D reconstruction of the scene based on the high-resolution dense depth map. The scene can be part of an XR environment. As part of an XR environment, the 3D reconstruction of the scene can include virtual objects.

FIG. 4 illustrates example method 400 of generating a fused sparse depth map. Method 400 can be performed by a system the same as or similar to system 100.

At block 402, the system applies a sensor depth at each pixel of the fused sparse depth map for which a corresponding sensor depth is available. The system, at block 402, applies a reconstructed sparse depth at each pixel of the fused sparse depth map for which a corresponding sensor depth is unavailable and a corresponding sparse depth is available. At block 406, the system applies a sensor depth at each pixel of the fused sparse depth map for which both a corresponding reconstructed depth and corresponding sensor depth are available, and the sensor depth has a confidence equal to or greater than a predetermined threshold. The system, at block 408, applies a depth that the system determines by weighting separately both a sensor depth and a reconstructed depth at each pixel of the fused sparse depth map for which both a corresponding sensor depth and reconstructed depth are available, and the sensor depth has a confidence less than the predetermined threshold.

Figure 5:
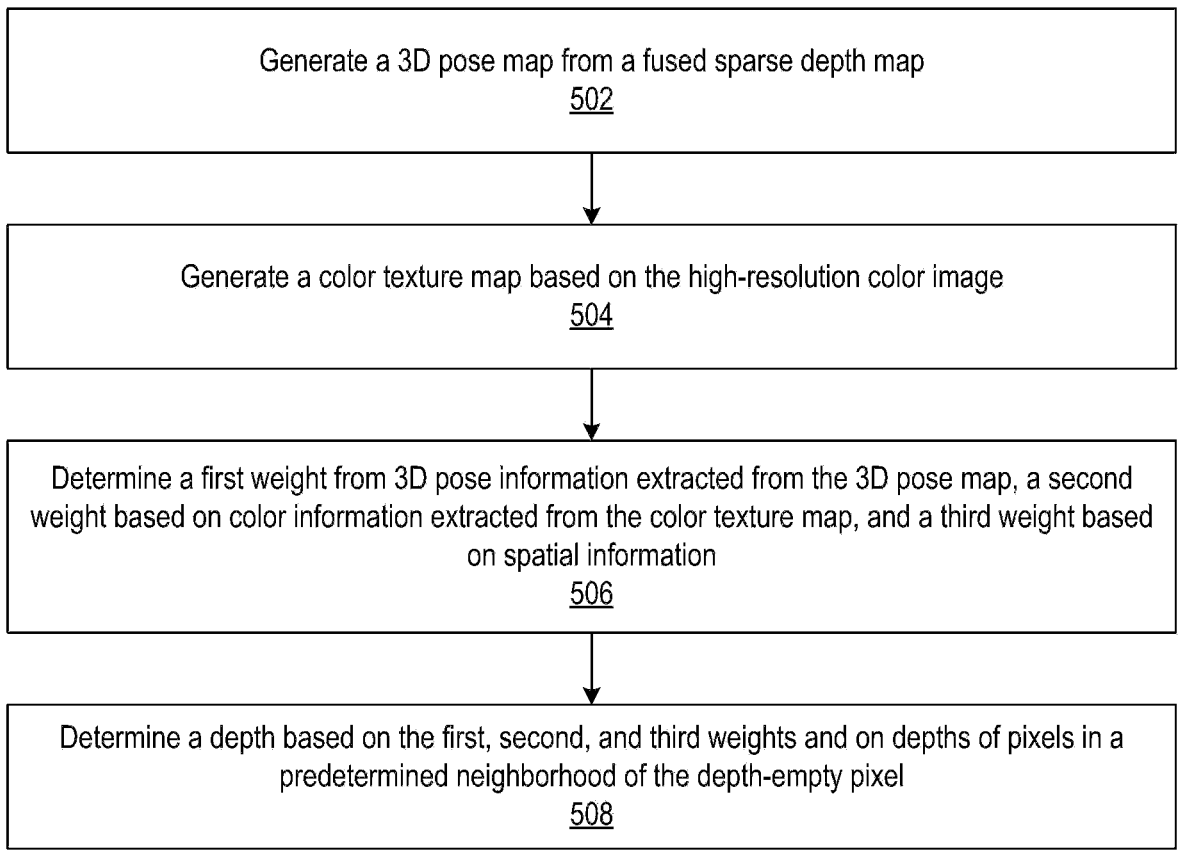
FIG. 5 illustrates an example method for determining depths for depth-empty pixels.

FIG. 5 illustrates example method 500 of determining depths for depth-empty pixels of a high-resolution dense depth map. The method can be performed by a system the same as or similar to system 100.

At block 502, the system generates a 3D pose map from a fused sparse depth map. The system, at block 504, generates a color texture map based on the high-resolution color image. At block 506, the system determines a first weight from 3D from pose information extracted from the 3D pose map, a second weight based on color information extracted from the color texture map, and a third weight based on spatial information. The system, at block 508, determines the depth for a depth-empty pixel based on the first, second, and third weights and on depths of pixels in a predetermined neighborhood of the depth-empty pixel.

FIG. 6 illustrates an example device 600 configured for operation as a system. Device 600 includes one or more processors 602 coupled to memory 604 through interface circuitry 606. Device 600 stores computer readable instructions (also referred to as "program code") within memory 604, which is an example of computer readable storage media. Processor(s) 606 execute the program code accessed from memory 604 via interface circuitry 606.

Memory 604 can include one or more physical memory devices such as local memory 608 and bulk storage device 610, for example. Local memory 608 is implemented as one or more non-persistent memory device(s) generally used during actual execution of the program code. Local memory 608 is an example of a runtime memory. Examples of local memory 608 include any of the various types of RAM suitable for use by a processor for executing program code. Bulk storage device 610 is implemented as a persistent data storage device. Examples of bulk storage device 610 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 600 can also include one or more cache memories (not shown) that provide temporary storage of at least some program code in order to reduce the number of times program code must be retrieved from a bulk storage device during execution.

Examples of interface circuitry 606 include, but are not limited to, an input/output (I/O) subsystem, an I/O interface, a bus system, and a memory interface. For example, interface circuitry 606 can be implemented as any of a variety of bus structures and/or combinations of bus structures including a memory bus or memory controller, a peripheral bus, an accelerated graphics port, and a processor or local bus.

In one or more example implementations, processor(s) 602, memory 604, and/or interface circuitry 606 are implemented as separate components. Processor(s) 602, memory 604, and/or interface circuitry 606 may be integrated in one or more integrated circuits. The various components in device 600, for example, can be coupled by one or more communication buses or signal lines (e.g., interconnects and/or wires). Memory 604 may be coupled to interface circuitry 606 via a memory interface, such as a memory controller or other memory interface (not shown).

Device 600 can include one or more displays. Illustratively, for example, device 600 includes display 612 (e.g., a screen). If device 600 is configured as an HMD, for example, display 612 can be a monocular HMD comprising a single optic or a binocular HMD comprising an optic in front of each eye. As an HMD, display 612 can comprise lenses and semi-transparent mirrors embedded in eyeglasses (also termed data glasses), a visor, or a helmet. Display 612 can be implemented as a touch-sensitive or touchscreen display capable of receiving touch input from a user. A touch sensitive display and/or a touch-sensitive pad is capable of detecting contact, movement, gestures, and breaks in contact using any of a variety of avail, able touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 600 can include camera subsystem 614. Camera subsystem 614 can be coupled to interface circuitry 606 directly or through a suitable input/output (I/O) controller. Camera subsystem 614 can be coupled to optical sensor 616. Optical sensor 616 can be implemented using any of a variety of technologies. Examples of optical sensor 616 can include, but are not limited to, a charged coupled device (CCD) or a complementary metal-oxide semiconductor (CMOS) optical sensor. Optical sensor 616, for example, can be a depth sensor. Camera subsystem 614 and optical sensor 616 are capable of performing camera functions such as recording or capturing images and/or recording video.

Device 600 can include an audio subsystem 618. Audio subsystem 618 can be coupled to interface circuitry 606 directly or through a suitable input/output (I/O) controller. Audio subsystem 618 can be coupled to a speaker 620 and a microphone 622 to facilitate voice-enabled functions, such as voice recognition, voice replication, digital recording, and telephony functions.

Device 600 can include one or more wireless communication subsystems 624. Each of wireless communication subsystem(s) 624 can be coupled to interface circuitry 606 directly or through a suitable I/O controller (not shown). Each of wireless communication subsystem(s) 624 is capable of facilitating communication functions. Examples of wireless communication subsystems 624 can include, but are not limited to, radio frequency receivers and transmitters, and optical (e.g., infrared) receivers and transmitters. The specific design and implementation of wireless communication subsystem 624 can depend on the particular type of device 600 implemented and/or the communication network(s) over which device 600 is intended to operate.

As an illustrative and non-limiting example, wireless communication subsystem(s) 624 may be designed to operate over one or more mobile networks, WiFi networks, short range wireless networks (e.g., a Bluetooth), and/or any combination of the foregoing. Wireless communication subsystem(s) 624 can implement hosting protocols such that device 600 can be configured as a base station for other wireless devices.

Device 600 may include one or more sensors 626, each of which can be coupled to interface circuitry 606 directly or through a suitable I/O controller (not shown). Examples of sensor(s) 626 that can be included in device 600 include, but are not limited to, a motion sensor, a light sensor, and a proximity sensor to facilitate orientation, lighting, and proximity functions, respectively, of device 600. Other examples of sensors 626 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 600 in 3D, and an altimeter (e.g., an integrated circuit) capable of providing data indicating altitude.

Device 600 further may include one or more input/output (I/O) devices 628 coupled to interface circuitry 606. I/O device(s) 628 can be coupled to interface circuitry 606 either directly or through intervening I/O controllers (not shown). Examples of I/O devices 628 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 600 to become coupled to other systems, computer systems, remote printers, and/or remote storage devices through intervening private or public networks. Modems, cable modems, Ethernet interfaces, and wireless transceivers not part of wireless communication subsystem(s) 624 are examples of different types of network adapters that may be used with device 600. One or more of I/O devices 628 may be adapted to control functions of one or more or all of sensors 626 and/or one or more of wireless communication subsystem(s) 624.

Memory 604 stores program code. Examples of program code include, but are not limited to, routines, programs, objects, components, logic, and other data structures. For purposes of illustration, memory 604 stores an operating system 630 and application(s) 632. In addition, memory 604 can store high-resolution dense depth map generation program code 634 for implementing a system, such as system 100, including depth fusion engine 102, depth reconstruction engine 104, and feature extractor 106, which can perform functions described within this disclosure. 3D scene reconstruction program code 636, for example, can implement 3D scene reconstruction engine 108 to generate a 3D scene reconstruction based on a high-resolution dense depth map, as also described within this disclosure.

Device 600 is provided for purposes of illustration and not limitation. A device and/or system configured to perform the operations described herein can have a different architecture than illustrated in FIG. 6. The architecture can be a simplified version of the architecture described in connection with FIG. 6 that includes a memory capable of storing instructions and a processor capable of executing instructions. In this regard, device 600 may include fewer components than shown or additional components not illustrated in FIG. 6 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

Device 600 can be implemented as a data processing system, a communication device, or other suitable system that is suitable for storing and/or executing program code. Device 600 can be implemented as an edge device. Example implementations of device 600 can include, but are not to limited to, an HMD, a pair of AR glasses, a smart phone or other mobile device or phone, or a wearable computing device. In other example implementations, operations comparable to those described with respect to device 600 also can be implemented in other computing devices. Other computing devices include, for example, a computer (e.g., desktop, laptop, tablet computer), a television, an entertainment console, an XR system, or other appliance capable of cooperatively operating as a display device (e.g., HMD, AR glasses) or a source device (e.g., smartphone, console, computer) operating in conjunction with a display device, as described herein.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "real-time" means a level of processing responsiveness that a user or system senses as sufficiently immediate for a particular process or determination to be made, or that enables the processor to keep up with some external process.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The term "user" refers to a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method comprising:
    creating a high-resolution sparse depth map by mapping sensor depths, as generated by a depth sensor, from a low-resolution depth map to points corresponding to pixels of a high-resolution color image of a scene, wherein the high-resolution sparse depth map has a same resolution as the high-resolution color image;
    producing a fused sparse depth map by combining the high-resolution sparse depth map with sparse depths reconstructed from the high-resolution color image, wherein the combining includes applying depths to pixels of the high-resolution sparse depth map based on a depth fusion policy that selects the depths for the pixels as the sensor depth of the pixel, a sparse depth of the pixel as reconstructed, or a weighted average of the sensor depth for the pixel and the sparse depth of the pixel as reconstructed; and
    generating a high-resolution dense depth map based on fused sparse depths of the fused sparse depth map.

2. The method of claim 1, comprising:
    generating a three-dimensional (3D) reconstruction of the scene based on the high-resolution dense depth map and the high-resolution color image.

3. The method of claim 1, wherein
    the producing the fused sparse depth map comprises:
        applying a sensor depth at each pixel of the fused sparse depth map for which a corresponding sensor depth is available and a corresponding sparse depth is unavailable;
        applying a sparse depth at each pixel of the fused sparse depth map for which a corresponding sensor depth is unavailable and a corresponding sparse depth is available;
        applying a sensor depth at each pixel of the fused sparse depth map for which both a corresponding sparse depth and corresponding sensor depth are available and the sensor depth has a confidence equal to or greater than a predetermined threshold; and
        applying a depth determined by weighting a sensor depth and a sparse depth at each pixel of the fused sparse depth map for which both a corresponding sensor depth and sparse depth are available and the sensor depth has a confidence less than the predetermined threshold.

4. The method of claim 1, wherein
    the generating the high-resolution dense depth map comprises:
        generating a 3D pose map from the fused sparse depth map;
        generating a color texture map based on the high-resolution color image;
        determining a first weight as a normalized pose difference between a selected pixel and each pixel within a predetermined neighborhood of the selected pixel from the 3D pose map, a second weight as a normalized spatial difference between the selected pixel and each pixel within the predetermined neighborhood from the color texture map, and a third weight as a normalized color intensity difference between the selected pixel and each pixel within the predetermined neighborhood from the color texture map; and determining a depth based on the first, second, and third weights and on depths of pixels in a predetermined neighborhood of a depth-empty pixel.

5. The method of claim 1, comprising:

receiving the low-resolution depth map from a depth sensor and extracting from the low-resolution depth map a first feature; and receiving the high-resolution color image from a camera and extracting from the high-resolution color image a second feature.

6. The method of claim 5, comprising:

storing, in a data structure, depths and properties corresponding to the first feature extracted from the low-resolution depth map and the second feature extracted from the high-resolution color image;

wherein the generating the high-resolution dense depth map is based in part on the data structure.

7. The method of claim 1, wherein the scene is part of an extended reality environment.

8. A system, comprising:

a processor configured to initiate operations including:

creating a high-resolution sparse depth map by mapping sensor depths, as generated by a depth sensor, from a low-resolution depth map to points corresponding to pixels of a high-resolution color image of a scene, wherein the high-resolution sparse depth map has a same resolution as the high-resolution color image;

producing a fused sparse depth map by combining the high-resolution sparse depth map with sparse depths reconstructed from the high-resolution color image, wherein the combining includes applying depths to pixels of the high-resolution sparse depth map based on a depth fusion policy that selects the depths for the pixels as the sensor depth of the pixel, a sparse depth of the pixel as reconstructed, or a weighted average of the sensor depth for the pixel and the sparse depth of the pixel as reconstructed; and generating a high-resolution dense depth map based on fused sparse depths of the fused sparse depth map.

9. The system of claim 8, wherein the processor is configured to initiate operations further including:

generating a three-dimensional (3D) reconstruction of the scene based on the high-resolution dense depth map and the high-resolution color image.

10. The system of claim 8, wherein the producing the fused sparse depth map includes:

applying a sensor depth at each pixel of the fused sparse depth map for which a corresponding sensor depth is available and a corresponding sparse depth is unavailable;

applying a sparse depth at each pixel of the fused sparse depth map for which a corresponding sensor depth is unavailable and a corresponding sparse depth is available;

applying a sensor depth at each pixel of the fused sparse depth map for which both a corresponding sparse depth and corresponding sensor depth are available and the sensor depth has a confidence equal to or greater than a predetermined threshold; and applying a depth determined by weighting a sensor depth and a sparse depth at each pixel of the fused sparse depth map for which both a corresponding sensor depth and sparse depth are available and the sensor depth has a confidence less than the predetermined threshold.

11. The system of claim 8, wherein the generating the high-resolution dense depth map comprises, for each depth-empty pixel of the high-resolution dense depth map:

generating a 3D pose map from the fused sparse depth map;

generating a color texture map based on the high-resolution color image;

determining a first weight as a normalized pose difference between a selected pixel and each pixel within a predetermined neighborhood of the selected pixel from the 3D pose map, a second weight as a normalized spatial difference between the selected pixel and each pixel within the predetermined neighborhood from the color texture map, and a third weight as a normalized color intensity difference between the selected pixel and each pixel within the predetermined neighborhood from the color texture map; and determining a depth based on the first, second, and third weights and on depths of pixels in a predetermined neighborhood of a depth-empty pixel.

12. The system of claim 8, wherein the processor is configured to initiate operations further including:

receiving the low-resolution depth map from a depth sensor and extracting from the low-resolution depth map a first feature; and receiving the high-resolution color image from a camera and extracting from the high-resolution color image a second feature.

13. The system of claim 12, wherein the processor is configured to initiate operations further including:

storing, in a data structure, depths and properties corresponding to the first feature extracted from the low-resolution depth map and the second feature extracted from the high-resolution color image;

wherein the generating the high-resolution dense depth map is based in part on the data structure.

14. A computer program product, the computer program product comprising:

one or more computer-readable storage media and program instructions collectively stored on the one or more computer-readable storage media, the program instructions executable by a processor to cause the processor to initiate operations including:

creating a high-resolution sparse depth map by mapping sensor depths, as generated by a depth sensor, from a low-resolution depth map to points corresponding to pixels of a high-resolution color image of a scene, wherein the high-resolution sparse depth map has a same resolution as the high-resolution color image;

producing a fused sparse depth map by combining the high-resolution sparse depth map with sparse depths reconstructed from the high-resolution color image, wherein the combining includes applying depths to pixels of the high-resolution sparse depth map based on a depth fusion policy that selects the depths for the pixels as the sensor depth of the pixel, a sparse depth of the pixel as reconstructed, or a weighted average of the sensor depth for the pixel and the sparse depth of the pixel as reconstructed; and generating a high-resolution dense depth map based on fused sparse depths of the fused sparse depth map.

15. The computer program product of claim 14, wherein the program instructions are executable by the processor to cause the processor to initiate operations further including:

generating a three-dimensional (3D) reconstruction of the scene based on the high-resolution dense depth map and the high-resolution color image.

16. The computer program product of claim 14, wherein the producing the fused sparse depth map comprises:

applying a sensor depth at each pixel of the fused sparse depth map for which a corresponding sensor depth is available and a corresponding sparse depth is unavailable;

applying a sparse depth at each pixel of the fused sparse depth map for which a corresponding sensor depth is unavailable and a corresponding sparse depth is available;

applying a sensor depth at each pixel of the fused sparse depth map for which both a corresponding sparse depth and corresponding sensor depth are available and the sensor depth has a confidence equal to or greater than a predetermined threshold; and applying a depth determined by weighting a sensor depth and a sparse depth at each pixel of the fused sparse depth map for which both a corresponding sensor depth and sparse depth are available and the sensor depth has a confidence less than the predetermined threshold.

17. The computer program product of claim 14, wherein the generating the high-resolution dense depth map includes, for each depth-empty pixel of the high-resolution dense depth map:

generating a 3D pose map from the fused sparse depth map;

generating a color texture map based on the high-resolution color image;

determining a first weight as a normalized pose difference between a selected pixel and each pixel within a predetermined neighborhood of the selected pixel from the 3D pose map, a second weight as a normalized spatial difference between the selected pixel and each pixel within the predetermined neighborhood from the color texture map, and a third weight as a normalized color intensity difference between the selected pixel and each pixel within the predetermined neighborhood from the color texture map; and determining a depth based on the first, second, and third weights and on depths of pixels in a predetermined neighborhood of a depth-empty pixel.

18. The computer program product of claim 14, wherein the program instructions are executable by the processor to cause the processor to initiate operations further including:

receiving the low-resolution depth map from a depth sensor and extracting from the low-resolution depth map a first feature; and receiving the high-resolution color image from a camera and extracting from the high-resolution color image a second feature.

19. The computer program product of claim 18, wherein the program instructions are executable by the processor to cause the processor to initiate operations further including:

storing, in a data structure, depths and properties corresponding to the first feature extracted from the low-resolution depth map and the second feature extracted from the high-resolution color image;

wherein the generating the high-resolution dense depth map is based in part on the data structure.

20. The computer program product of claim 14, wherein the scene is part of an extended reality environment.

* * * * *